Patented Feb. 17, 1925.

1,526,694

UNITED STATES PATENT OFFICE.

FREDERICK HOFFMAN CHRISTIANSEN, OF PORTLAND, OREGON, ASSIGNOR TO COMPO STONE COMPANY, A CORPORATION OF OREGON.

MANUFACTURE OF FILLERS FOR CEMENT CONCRETE.

No Drawing. Application filed March 31, 1919, Serial No. 286,613. Renewed December 13, 1921. Serial No. 522,144.

*To all whom it may concern:*

Be it known that I, FREDERICK HOFFMAN CHRISTIANSEN, a resident of Portland, county of Multnomah, State of Oregon, have invented certain new and useful Improvements in the Manufacture of Fillers for Cement Concrete, of which the following is a specification.

Relating as it does to the manufacture of a filler, my invention includes in respect to novelty and utility both a process and a product, and has for its object the production of a new and improced material that is especially adapted for use as a filler in the manufacture of concrete from cement.

As at present understood in the art, concrete is an artificial stone composed of sand, broken stone, and cement. The term "cement" as used herein is intended to include any kind of cement, such as is loosely called "hydraulic cement", as for example, Portland, Rosendale, natural-rock, and like cements. The following brief review of the prior art, in view of the specification that follows, will render my invention readily intelligible to one skilled in the art to whom this instrument is addressed.

Heretofore, in the manufacture of concrete, a mass of sand and cement combined in suitable proportions and rendered plastic by the addition of water is mixed with broken stone filler, or coarse ingredient. The cement in "setting" acts as a binder to the sand and the broken stone to unite the various elements into one, strong, conglomerate mass. To enable the cement to perform said function, the "setting" of it is an essential factor. The water of the plastic mass, being the element which contributes the initial plasticity to the mass, permeates the interstitial spaces between the solid particles of the mixture. Again, the so-called "setting" process, or that in which the plastic mass hardens, divides itself into two stages. The first stage is that in which the water of the mixture aforesaid is taken up in the hardening process. In the effecting of the first stage of the "setting" the originally plastic mass in the mixture must part nally with all its water, and must substantially find additional water in order afterwards to effect the final "setting," or, in other words, the maturing of the concrete.

Such additional water as is required for the final "setting" has been heretofore provided in various ways from some source of supply outside the mixture itself.

By my invention, I provide a filler, which, besides having various distinctive and useful qualities as compared with a solid material like sand or broken stone, is especially distinguished by the presence within it of capillaries. In the "setting" process incident generally to the manufacture of concrete, those capillaries referred to in the last sentence perform, as will be hereinafter explained, a distinctly novel and useful function.

My filler is preferably made of a natural cellular substance like wood. Wood is by nature furnished with and permeated by capillaries, which, in the natural state of growth, are filled with a liquid that, to make the term general, may be designated sap.

In the manufacture of my filler, the wood is first segregated into small particles so as to render it suitable as a coarse ingredient for concrete. The form of segregation thus imparted to the wood is correspondent to the broken stone or coarse ingredient of ordinary concrete, and is found in coarse sawdust, excelsior, shavings, or any form of segregation in which the cellular integrity of the wood remains substantially unimpaired, and in which, therefore, its capillarity, in conjunction with that bulk which the nature of the coarse ingredient for concrete requires, may be by my process preserved. Wood having in the green state its capillaries filled with sap, to use the general term already adopted, it results that when subjected to any of the ordinary methods of drying, those capillaries become more or less plugged by the residuum of the sap left in them by the drying process. Moreover, many kinds of wood, and those ordinarily most serviceable for use in my process, contain, or develop in drying, resins, acids, or other deleterious substances which affect unkindly hydrated cement to such an extent as would prohibit their economic use if such use had been contemplated, as it has not been, so far as I am informed, for the manufacture of concrete. Besides the said prohibitive qualities of the constituents of some untreated natural cellular substances, an additional objectionable feature is introduced by any usual method of segregation of the substance, for example by the sawing of wood. In such case, the action of the saw tends to close and obstruct the ends of the capillaries in the substance.

My invention comprehends the cleansing of the capillaries of a natural substance, such, for example, as wood, by any means which may be employed to effect the purpose without destroying the cellular structure of the substance. In order to render the lengths of the capillaries accessible throughout to the cleansing operation, the substance to be cleansed, owing to the minuteness of its capillaries, must be divided into small particles, as, for intance, coarse-grained sawdust.

The product of the cleansing operation referred to is a material of cellular structure, or, in other words, a skeleton, whose capillaries are vacated and made ready to be supplied anew with a predetermined liquid, as through hydration.

The cleansing operation above referred to is preferably accomplished by a washing or detergent action. In dealing with some woods, the detergent action of hot water or of steam alone may be sufficient to cleanse the capillaries. But in dealing with other woods, particularly those containing pitch, rosin, or acidulous sap, the treatment desirable for some woods, and for some essential, is to aid the simple washing action by the addition to the water or steam of an alkaline detergent.

Where it is necessary to employ an alkaline detergent, I find that a solution of caustic soda or potash in water, in the proportion of one pound of potash to six gallons of water, may be depended upon. In practice, a mass of the particles to be treated is subjected to the solution named, in quantity sufficient to cover the mass. Boiling of the particles in the solution for one hour or soaking them therein for a week will suffice to thoroughly cleanse the capillaries of the wood without destroying or functionally impairing its cellular structure. After the treatment referred to, of boiling or of soaking, as may be preferred, the particles of wood are drained of the solution, and are promptly afterwards subjected to a thorough washing, preferably in hot water or steam. After washing, adequately to vacate the capillaries of deleterious matter, the product can be, if desired, used immediately, the water supplied by the washing operation being sufficient to fill the cleansed capillaries therewith. If, however, the product is intended for shipment in commerce, it is desirable to dehydrate it for that purpose, and to supply it anew with water at the place in which it is designed for ultimate consumption.

The capillaries, having been properly cleansed, may afterwards afford a reservoir for water that may be drawn upon to meet the requirements of the "setting" of the cement in the manufacture of concrete from my filler. The interstitial water of the plastic cement mixture is utilized, as heretofore in concrete manufacture, to meet the requirements of the first stage of the "setting" process, the water in the capillaries holding itself in reserve for the final stage thereof.

The ultimate process and its product above alluded to, although of my invention, do not belong to the one specified herein, but constitute matter of a separate application for patent.

What I claim is:

1. The process, for the object specified, of treating sawdust and the like having capillaries, which consists in cleansing and vacating of their previous contents the capillaries of said substance without destroying the capillary structure, preparatory to filling them anew with a predetermined liquid.

2. The process, for the object specified, of treating sawdust and the like having capillaries, which consists in subjecting said substance to a washing action sufficient to cleanse without destroying the capillaries thereof and without disintegrating the substance.

3. The process, for the object specified, of treating sawdust and the like having capillaries, which consists in cleansing and vacating the capillaries thereof by subjecting the lengths of said capillaries throughout to the detergent action of an alkaline solution of a strength and for a time sufficient to effect the object in view without destruction of the capillaries or disintegration of the structure of the substance.

4. The process, for the object specified, of treating sawdust and the like having capillaries, which consists in cleansing and vacating the capillaries thereof by subjecting the lengths of said capillaries throughout to the detergent action of an alkaline solution of a strength and for a time sufficient to effect the object in view without destruction of the capillaries or disintegration of the structure of the substance and subsequently dehydrating the substance to thereby remove the moisture from the capillaries thereof.

5. An artificial product adapted for the use specified consisting of particles of sawdust and the like of substantially unimpaired capillary integrity and whose capillaries have been cleansed and vacated to fit them to be filled anew with a predetermined liquid.

In testimony whereof, I have affixed my signature in the presence of two witnesses.

FREDERICK HOFFMAN CHRISTIANSEN.

Executed in the presence of:
W. K. ROYAL,
S. H. LABBIE.